(12) United States Patent
Suzuki

(10) Patent No.: US 7,239,455 B2
(45) Date of Patent: Jul. 3, 2007

(54) TELEPHOTO LENS

(75) Inventor: Takashi Suzuki, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/367,393

(22) Filed: Mar. 6, 2006

(65) Prior Publication Data

US 2006/0209426 A1   Sep. 21, 2006

(30) Foreign Application Priority Data

Mar. 7, 2005   (JP)   ............... P.2005-062459

(51) Int. Cl.
G02B 13/02 (2006.01)
G02B 15/14 (2006.01)
(52) U.S. Cl. ............... 359/745; 359/689; 359/690
(58) Field of Classification Search ............... 359/676, 359/686–690, 745
See application file for complete search history.

(56) References Cited

U.S. PATENT DOCUMENTS 4,534,626 A   8/1985 Mihara
2002/0041452 A1   4/2002 Ozaki

FOREIGN PATENT DOCUMENTS

JP   2002-55275 A   2/2002
JP   2004-226648 A   8/2004

*Primary Examiner*—Scott J. Sugarman
*Assistant Examiner*—Darryl J. Collins
(74) *Attorney, Agent, or Firm*—Birch, Stewart, Kolasch & Birch, LLP

(57) ABSTRACT

A telephoto lens is provided and has three lens groups as a whole. A first lens group includes a first positive lens having a meniscus shape and having a convex surface on an object side thereof, a negative lens arranged on an image side of the first positive lens and having a concave surface on the image side thereof, and a second positive lens arranged on the image side of the negative lens and having a convex surface on the object side thereof. Further, the following Condition Equations are satisfied. $v11$ designates an Abbe number of the first positive lens, $v12$ designates an Abbe number of the negative lens, $v13$ designates an Abbe number of the second positive lens.

$35 < v11 < 50$ (1)

$v12 < 45$ (2)

$75 < v13$ (3)

$v12 < v11$ (4)

5 Claims, 4 Drawing Sheets

TELEPHOTO LENS

FIELD OF THE INVENTION

The present invention relates to a telephoto lens used in, for example, a single-lens reflex camera or a video camera, constituted by, for example, an inner focus type and having an angle of view of about 6° through 20°.

BACKGROUND OF THE INVENTION

In a focusing system of an imaging lens, there are a system of moving a total of a lens system and a system of moving a portion of a lens system. In the case of a telephoto lens, in comparison with a standard lens, a lens system becomes large-sized and also a weight thereof becomes heavy and therefore, the system of moving a portion of a lens system is frequently adopted.

For example, JP-A-2002-55275 discloses a telephoto lens having a half-field angle of about 4° through 8° (a focal length of about 150 mm through 300 mm in a 35 mm film) of an inner focus type constituted by three lens groups having a positive, a negative, a positive refracting power successively from an object side, in which the focusing is performed by moving the second lens group having the negative refracting power. The first lens group is constituted by 3 lenses of a positive first lens, a positive second lens and a negative third lens successively from the object side. The second lens group is constituted by 2 lenses of a negative fourth lens and a positive fifth lens successively from the object side. For achromatism, a glass material having a large ν value (Abbe number) is adopted for the positive first and second lenses, and a glass material having a small ν value is adopted for the negative third and fourth lenses.

The telephoto lens disclosed in JP-A-2002-55275 is constituted by an optical system of the inner focus type which is comparatively excellent in an optical function from an infinite object point over to a close range and is advantageous in small-sized formation. Here, as a general method of correcting chromatic aberration, similar to the telephoto lens disclosed in JP-A-2002-55275, glass having a large ν value is used for a positive lens and glass having a small ν value is adopted for a negative lens. An amount of secondary chromatic aberration which remains at this occasion is determined by a magnitude of anomalous dispersion of the glass adopted for the positive lens. Although in order to reduce the secondary chromatic aberration, much of the anomalous dispersion glass may be adopted for the positive lens in the lenses, according to the method, there poses a problem that a number of elements of the anomalous dispersion glass is increased, which is disadvantageous in view of cost.

SUMMARY OF THE INVENTION

An object of an illustrative, non-limiting embodiment of the invention is to provide a telephoto lens excellent in correcting chromatic aberration while restraining a number of elements of anomalous dispersion glass used. Also, the invention is not required to provide the advantages described above, and an illustrative, non-limiting embodiment of the invention may provide different advantages.

An exemplary embodiment of the telephoto lens of the invention includes, in order from an object side of the telephoto lens: a first lens group having a positive refracting power; a second lens group having a negative refracting power; and a third lens group including an aperture diaphragm. The first lens group includes: a first positive lens having a meniscus shape and having a convex surface on the object side thereof; a negative lens arranged on an image side of the first positive lens and having a concave surface on the image side thereof; and a second positive lens arranged on the image side of the negative lens and having a convex surface on the object side thereof. (The first lens group include, in order from the object side: a first positive lens; a negative lens; and a second positive lens.) Further, the telephoto lens is constituted to satisfy the following Condition Equations. In the equations, ν11 designates an Abbe number of the first positive lens in the first lens group, ν12 designates an Abbe number of the negative lens in the first lens group, and ν13 designates an Abbe number of the second positive lens in the first lens group.

$$35 < \nu 11 < 50 \tag{1}$$

$$\nu 12 < 45 \tag{2}$$

$$75 < \nu 13 \tag{3}$$

$$\nu 12 < \nu 11 \tag{4}$$

According to an exemplary embodiment of a telephoto lens of the invention, by specifying shapes of the respective lenses as described above and satisfying the respective Condition Equations, correction of on-axis chromatic aberration and correction of lateral color necessary for the high function telephoto lens can be carried out and a high optical function can be achieved. Particularly, by positively adopting a glass material having a small ν value satisfying Condition Equation (1) for the first positive lens on the object side and pertinently setting glass materials of the other lenses, secondary chromatic aberration is corrected while restraining a number of elements of anomalous dispersion glass used.

In an exemplary embodiment of a telephoto lens of the invention, it is preferable that the second lens group is constituted by at least one positive lens and at least one negative lens, and the second lens group is moved to the image side when a focus is adjusted from infinite to a close range.

It is preferable to constitute an exemplary embodiment of a telephoto lens of the invention to satisfy Condition Equation (5) shown below. In the equation, f designates a focal length of an entire system of the telephoto lens, and f11 designates a focal length of the first positive lens in the first lens group $$0.5 < f11/f < 1.2 \tag{5}$$

According to a telephoto lens of the invention, the lens is constituted by three groups as a whole, shapes and glass materials of the respective lenses are made to be pertinent, particularly, the glass material having a small ν value satisfying Condition Equation (1) is positively adopted for the first positive lens on the object side, the glass materials of the other lenses are pertinently set and therefore, the lens can realize an excellent function in correcting chromatic aberration while restraining a number of sheets of anomalous dispersion glass used.

DETAILED DESCRIPTION OF THE INVENTION

Exemplary embodiments of the invention will be explained in details in reference to the drawings as follows.

Figure 1:
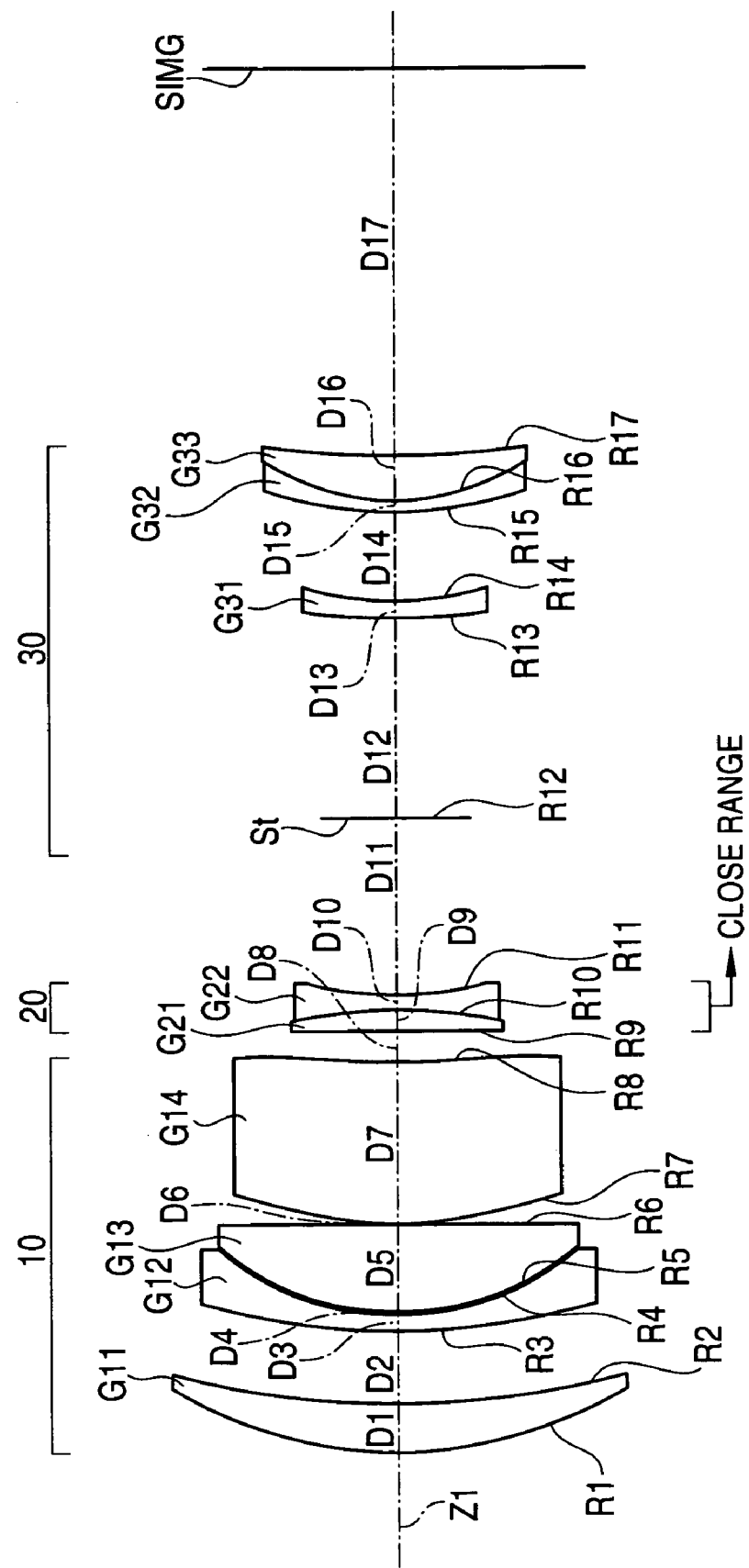
FIG. 1 shows a first constitutional example of a telephoto lens according to an illustrative, non-limiting embodiment of the invention and is a lens sectional view in correspondence with Example 1.
Figure 2:
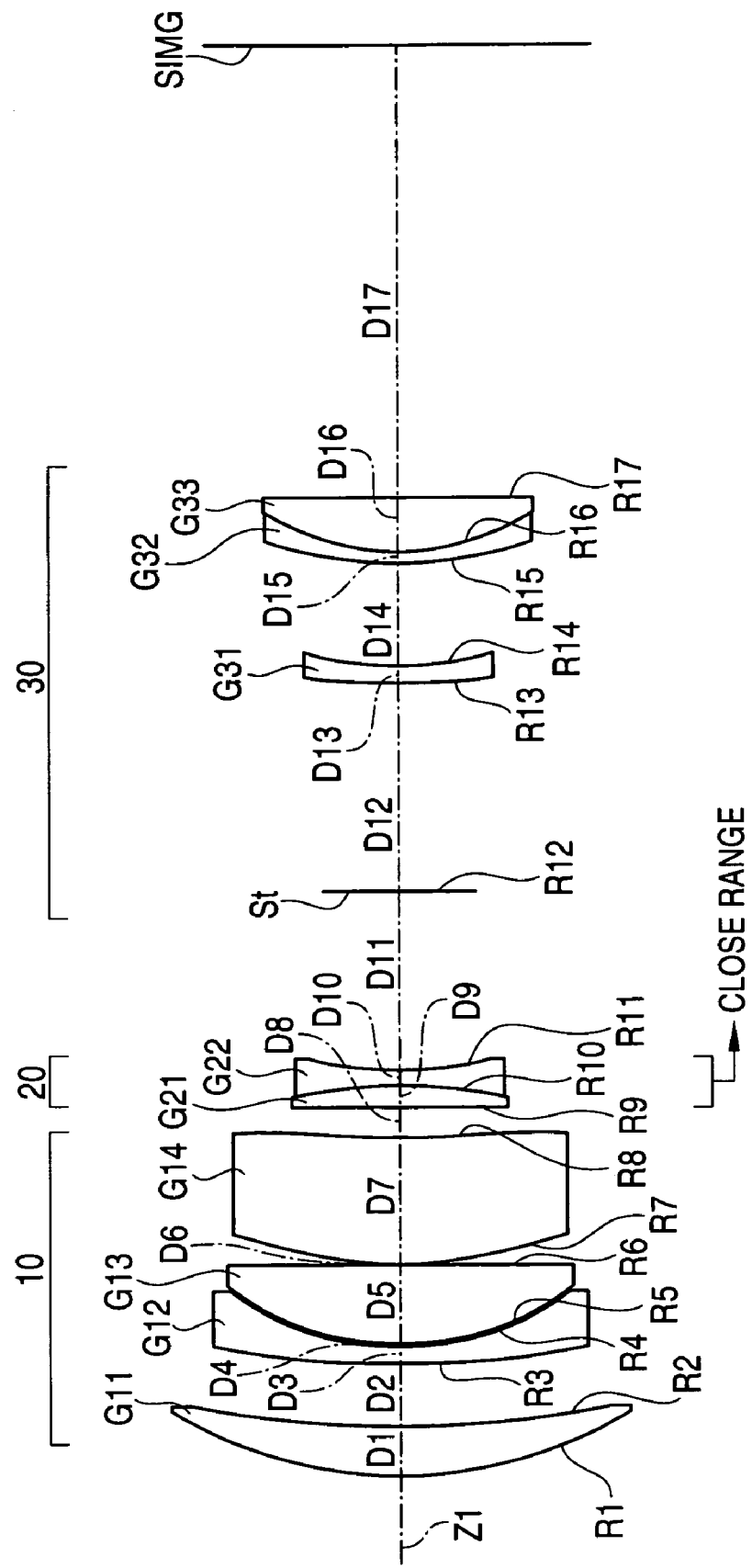
FIG. 2 shows a second constitutional example of a telephoto lens according to an illustrative, non-limiting embodiment of the invention and is a lens sectional view in correspondence with Example 2.
Figure 3:
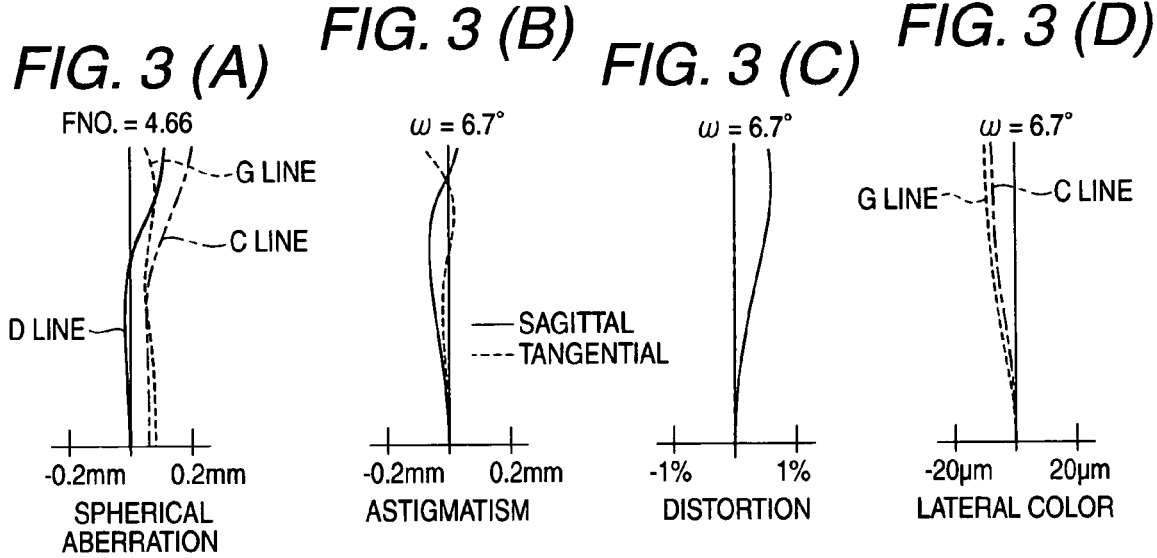
FIG. 3 illustrates aberration diagrams showing various aberrations when an infinite object lens is focused in the telephoto lens according to example 1, (A) shows spherical aberration, (B) shows astigmatism, (C) shows distortion, (D) shows lateral color.
Figure 4:
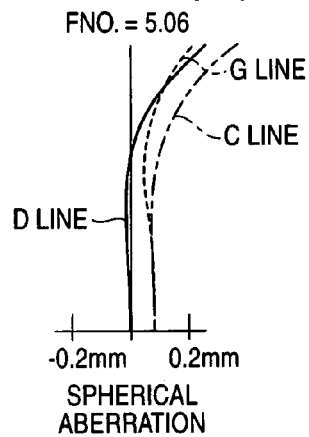
FIG. 4 illustrates aberration diagrams showing respective aberrations when an infinite object point is focused in the telephoto lens according to Example 2, (A) shows spherical aberration, (B) shows astigmatism, (C) shows distortion, (D) shows lateral color.
Figure 4:
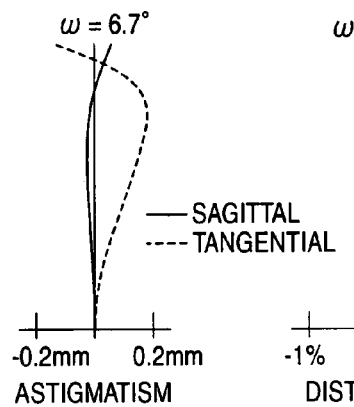
Figure 4:
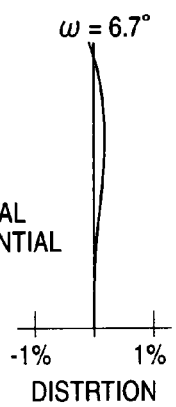
Figure 4:
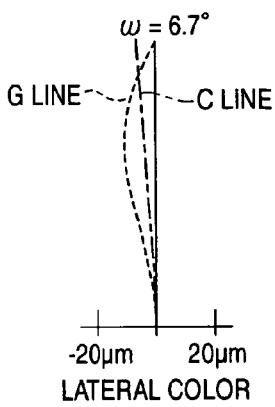
Figure 5:
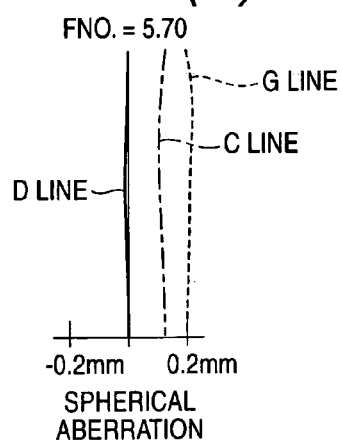
FIG. 5 illustrates aberration diagrams showing various aberrations of a telephoto lens of a background art as a comparative example, (A) shows spherical aberration, (B) shows astigmatism, (C) shows distortion, (D) shows lateral color.
Figure 5:
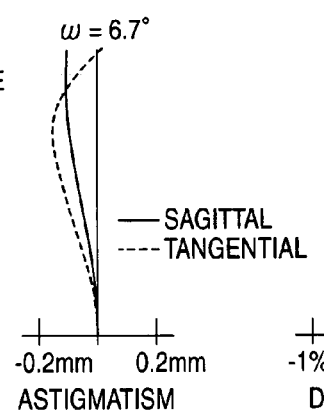
Figure 5:
Figure 5:
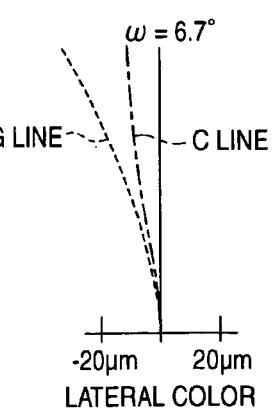

FIG. 1 shows a first constituting example of a telephoto lens according to an exemplary embodiment of the invention. The constitutional example corresponds to a lens constitution of a first numerical value example (Table 1), mentioned later. Further, FIG. 2 shows a second constitutional example. The constitutional example corresponds to a lens constitution of a second numerical value example (Table 2), mentioned later. Further, FIGS. 1 and 2 show lens arrangements in a state of being focused to an infinite object point. In FIGS. 1 and 2, notation Ri designates a radius of curvature of an i-th surface the notation of which is attached to successively increase as proceeding to an image side (focusing side) by defining a surface of a constituent element on an object side the most as a first surface. Notation Di designates a surface distance on an optical axis Z1 between an i-th surface and an (i+1)-th surface. Notation Simg designates a focusing surface (imaging surface). Further, a basic constitution stays the same in both of the respective constitutional examples and therefore, an explanation will be given based on the first constitutional example shown in FIG. 1 as follows.

A telephoto lens is preferably mounted to, for example, a single-lens reflex camera or a video camera. A telephoto lens is provided with a first lens group 10 having a positive refracting power, a second lens group 20 having a negative refracting power, a third lens group 30 including an aperture diaphragm St and having a weak positive refracting power along the optical axis Z1 successively from the object side. According to the telephoto lens, as illustrated, by moving the second lens group 20 as a focusing group to the image side along the optical axis Z1, focus can be adjusted from an infinite object point to a close range. Further, various optical members of an optical filter, a cover glass or the like may be arranged between the third lens group 30 and the focusing surface Simg in accordance with a constitution of a camera side mounted with the lenses.

The first lens group 10 includes at least a first positive lens having a meniscus shape and having a convex surface on the object side, a negative lens arranged on the image side of the first positive lens and having a concave surface on the image side, and a second positive lens arranged on the image side of the negative lens and having a convex surface on the object side. Further specifically, for example, the first lens group 10 includes a positive lens G11 having a meniscus shape and having a convex surface on the object side, a negative lens G12 having a meniscus shape and having a concave surface on the image side, a positive lens G13 having a bi-convex shape, and a positive lens G14 having a meniscus shape and having a convex surface on the object side.

Here, the positive lens G11 corresponds to the 'first positive lens', the negative lens G12 corresponds to the 'negative lens' and the positive lens G13 corresponds to the 'second positive lens'.

The second lens group 20 includes at least one positive lens and at least one negative lens. Further specifically, for example, the second lens group 20 includes a cemented lens comprising a positive lens G21 and a negative lens G22 successively from the object side. The third lens group 30 includes, for example, an aperture diaphragm St, a lens G31 and a cemented lens comprising a negative lens G32 and a positive lens G33, successively from the object side.

The telephoto lens satisfies Condition Equations (1) through (4), shown below. In the equations, v11 designates an Abbe number of the first positive lens (positive lens G11) in the first lens group 10, v12 designates an Abbe number of the negative lens (negative lens G12) in the first lens group 10, v13 designates an Abbe number of the second positive lens (positive lens G13) in the first lens group 10.

$$35 < v11 < 50 \tag{1}$$

$$v12 < 45 \tag{2}$$

$$75 < v13 \tag{3}$$

$$v12 < v11 \tag{4}$$

It is preferable for the telephoto lens to further satisfy Condition Equation (5) shown below. In the equation, f designates a focal length of an entire lens system, f11 designates a focal length of the first positive lens (positive lens G11) in the first lens group 10.

$$0.5 < f11/f < 1.2 \tag{5}$$

Further, with regard to conditions of Condition Equations (1), (2), (3), (5), it is further preferable to further satisfy numerical ranges shown below. Thereby, aberration can be corrected further excellently.

$$38 < v11 < 45 \tag{1A}$$

$$v12 < 40 \tag{2A}$$

$$80 < v13 \tag{3A}$$

$$0.55 < f11/f < 0.8 \tag{5A}$$

Next, operation and effect of the telephoto lens constituted as described above will be explained.

According to the telephoto lens, in the lens type constituted by three lens groups as a whole, focus is adjusted by moving the second lens group 20 having the negative refracting power. By constituting the inner focus type, the constitution becomes advantageous for small-size formation. Further, by specifying the shapes of the respective lenses as described above and satisfying the respective Condition Equations, as explained below, correction of on-axis chromatic aberration and lateral color necessary for the telephoto lens having a high function can be carried out and a high optical function can be achieved.

Condition Equation (1) is a condition necessary mainly for correcting on-axis chromatic aberration and lateral color in correcting chromatic aberration. Although in a general method of correcting chromatic aberration, a glass material having a large ν value (Abbe number) is adopted for a positive lens and a glass material having a small ν value is adopted for a negative lens, an amount of secondary chromatic aberration which remains at this occasion is determined by a magnitude of anomalous dispersion of glass adopted in the positive lens. Although in order to reduce the secondary chromatic aberration, much of anomalous dispersion glass may be adopted for the positive lens in the lenses, according to the method, a number of elements of the anomalous dispersion glass is increased, which becomes disadvantageous in view of cost. Hence, according to the embodiment, a glass material having a small ν value satisfying Condition Equation (1) is positively adopted for the first positive lens (positive lens G11). In this case, correction of chromatic aberration of a total of the lenses is not sufficient and in order to sufficiently correct the chromatic aberration, achromatism by strong power is requested. By adopting anomalous dispersion glass for the achromatizing lens (mainly, positive lens G13), anomalous dispersion shares a large rate in a total of the lenses and secondary chromatic aberration on the axis is reduced.

Here, it is preferable that the positive lens G13 satisfies the following condition with regard to the anomalous dispersion δθg, F.

$$\delta\theta g, F \geq 0.18$$

where, δθg, F designates a deviation from a reference line of a partial dispersion ratio θg, F of g line, F line defined by the following equation:

$$\delta\theta g, F = (ng - nF)/(nF - nC),$$

where, refractive indices with respect to g line, F line and C line are respectively designated by ng, nF, nC. Here, the reference line is a straight line provided by connecting respective coordinate points of two glass materials constituting a reference on a graph constituting, for example, the ordinate by the partial dispersion ratio θg, F and constituting abscissa by Abbe number vd (Abbe number with respect to d line).

Generally, when, for example, a graph of ν versus θ is drawn by constituting the abscissa by Abbe number ν, and constituting the ordinate by a partial dispersion ratio θ, it is known that a number of glass materials are provided with a characteristic of being distributed along a reference line. Further, at the more remote position from the reference line the glass material is distributed, the more anomalous dispersion is provided to the glass material. Specifically, a reference line L is constituted by selecting two glass materials K7 and F2 of SCHOTT AG as normal optical glass and connecting coordinate points of the two glass materials K7 and F2 on a graph of vd versus θg, F. A value constituted by subtracting partial dispersion ratio θL in correspondence with Abbe number vd on the reference line L from partial dispersion ratio θg, F of an arbitrary glass material is made to constitute a deviation of partial dispersion ratio, that is, a value δθg, F showing anomalous dispersion of the arbitrary glass material. Anomalous dispersions δθg, F designate numerical values described in catalogs or the like of respective glass material makers and values inherent to respective glass materials.

When ν11 is below the lower limit of Condition Equation (1), correction of chromatic aberration of the total is not sufficient and the correction becomes difficult. When ν11 exceeds the upper limit of Condition Equation (1), the rate of anomalous dispersion of the achromatizing lens shared in the total of the lenses is reduced and secondary chromatic aberration on the axis is increased. When ν exceeds the upper limit of Condition Equation (2), correction of on-axis chromatic aberration of the total is not sufficient and the correction becomes difficult. When ν13 is below the lower limit of Condition Equation (3), correction of the on-axis chromatic aberration of the total is not sufficient and the correction becomes difficult. When Condition Equation (4) is not satisfied, correction of the on-axis chromatic aberration of the total is not sufficient and the correction becomes difficult.

Condition Equations (1) through (4) are also necessary for improving correction of secondary chromatic aberration of magnification. Although according to the telephoto lens, the positive power is arranged on the object side and the negative power is arranged on the image side and therefore, asymmetricity is increased and correction of secondary chromatic aberration of magnification becomes difficult, according to the embodiment, by arranging the positive lens G11 of glass having a small ν value on the object side, it is succeeded to correct secondary chromatic aberration of magnification.

When f11/f is blow the upper limit of Condition Equation (5), correction of secondary chromatic aberration can be effectively performed. When f11/f exceeds the lower limit of Condition Equation (5), correction can be effectively performed.

As has been explained above, the shapes and the glass materials of the respective lenses are pertinently set and therefore, a function excellent in correcting chromatic aberration can be realized while restraining a number of sheets of anomalous dispersion glass used. Thereby, the small-sized and high function telephoto lens having the angle of view of, for example, about 6° through 20° can be realized.

EXAMPLES

Next, an explanation will be given of specific numerical value examples of the telephoto lens according to the embodiment. In the following, a summarizing explanation will be given of a first and a second numerical value example (Examples 1, 2).

Table 1 shows specific lens data (Example 1) in correspondence with the constitution of the telephoto lens shown in FIG. 1. Further, Table 2 shows specific lens data (Example 2) in correspondence with the constitution of the telephoto lens shown in FIG. 2. A column of a surface No. Si in the lens data shown in Tables 1 and 2 shows a number of an i-th (i=1 through 17) surface attached with a notation to successively increase as proceeding to the image side by constituting a surface of a constituent element on the object side the most as a first surface with regard to the telephoto lenses according to the respective examples. A column of radius of curvature Ri shows a value of a radius of curvature of the i-th surface from the object side in correspondence with notation Ri attached in FIGS. 1 and 2. Also a column of surface interval Di similarly shows an interval on the optical axis between the i-th surface Si and the (i+1)-th surface Si+1 of the object side. Units of radius of curvature Ri and surface interval Di are millimeters (mm). A column of Ndi shows a value of a refractive index with respect to d line (587.6 nm) of an i-th lens element from the object side. A column of vdj shows a value of Abbe number of a j-th (j=1 through 9) lens element from the object side. Further, vd1, vd2, vd3 correspond to ν11, ν12, ν13 in the above-described Condition Equations. Tables 1 and 2 also show a value of a focal length f when an object point distance is at infinity (mm) and a value of F number (FNO.) and an angle of view $2\omega$ ($\omega$ is a semi angle of view).

TABLE 3

Lens Date of Example 1

| Si (Surface No.) | Ri (Radius of Curvature) | Di (Surface Distance) | Ndj (Refractive Index) | νdi (Abbe Number) |
|---|---|---|---|---|
| 1 | 76.668 | 8.94 | 1.70154 | 41.1 (ν11) |
| 2 | 154.990 | 13.27 | | |
| 3 | 127.540 | 2.90 | 1.80610 | 33.3 (ν12) |
| 4 | 48.901 | 0.48 | | |
| 5 | 48.803 | 16.36 | 1.43875 | 95.0 (ν13) |
| 6 | −1650.800 | 0.25 | | |
| 7 | 81.457 | 30.00 | 1.62041 | 60.4 |
| 8 | 227.580 | 5.55 | | |
| 9 | 1463.500 | 4.20 | 1.80518 | 25.5 |
| 10 | −88.987 | 2.80 | 1.74400 | 44.8 |
| 11 | 69.551 | 32.87 | | |
| 12 | (aperture diaphragm) | 37.08 | | |
| 13 | 147.600 | 3.00 | 1.74320 | 49.3 |
| 14 | 59.167 | 16.37 | | |
| 15 | 73.260 | 2.10 | 1.80518 | 25.5 |
| 16 | 42.110 | 8.54 | 1.80610 | 33.3 |
| 17 | 205.070 | | | |

(f = 291.95 mm, FNO = 4.66, $2\omega$ = 13.4°)

TABLE 2

Lens Date of Example 2

| Si (Surface No.) | Ri (Radius of Curvature) | Di (Surface Distance) | Ndj (Refractive Index) | νdi (Abbe Number) |
|---|---|---|---|---|
| 1 | 78.443 | 8.95 | 1.70154 | 41.1 (ν11) |
| 2 | 196.376 | 11.23 | | |
| 3 | 162.421 | 2.90 | 1.80610 | 33.3 (ν12) |
| 4 | 48.890 | 0.40 | | |
| 5 | 48.983 | 15.23 | 1.49700 | 81.6 (ν13) |
| 6 | −980.690 | 0.20 | | |
| 7 | 83.853 | 22.88 | 1.62041 | 60.4 |
| 8 | 198.667 | 5.55 | | |
| 9 | 3014.020 | 4.20 | 1.80518 | 25.5 |
| 10 | −89.782 | 2.80 | 1.74400 | 44.8 |
| 11 | 76.243 | 32.87 | | |
| 12 | (aperture diaphragm) | 38.15 | | |
| 13 | 279.180 | 3.00 | 1.74320 | 49.3 |
| 14 | 62.493 | 19.14 | | |
| 15 | 82.985 | 2.10 | 1.80518 | 25.5 |
| 16 | 40.408 | 9.85 | 1.80610 | 33.3 |
| 17 | 701.151 | | | |

(f = 292.09 mm, FNO = 5.06, $2\omega$ = 13.4°)

Table 3 shows values with regard to Condition Equations (1) through (5) summarized for the respective examples. As is known therefrom, the values of the respective examples satisfy conditions of Condition Equations (1) through (5). Further, the values also satisfy the numerical value ranges of Condition Equations (1A), (2A), (3A) and (5A).

TABLE 3

Values Concerning Condition Equations

| Condition Equation | Example 1 | Example 2 |
|---|---|---|
| (1) ν11 | 41.1 | 41.1 |
| (2) ν12 | 33.3 | 33.3 |
| (3) ν13 | 95.0 | 81.6 |
| (5) f11 | 206.54 mm | 180.54 mm |
| f | 291.95 mm | 292.09 mm |
| f11/f | 0.707 | 0.618 |

Further, although not shown particularly as data, with regard to respective examples, anomalous dispersion data $\theta g, F$ of the positive lens G13 satisfy the following condition:

$\delta\theta g, F \geq 0.18$

FIGS. 3(A) through (D) respectively show spherical aberration, astigmatism, distortion (distortion aberration), and lateral color when an infinite object point is focused in the telephoto lens according to Example 1. Although respective aberration diagrams show aberrations constituting a reference wavelength by d line, the spherical aberration diagram and the lateral color diagram also show aberrations with respect to g line (wavelength 435.8 nm), C line (wavelength 656.3 nm). In the astigmatism aberration diagram, a bold line indicates the aberration in a sagittal direction and a broken line indicates the aberration in a tangential direction. FNO. designates the F value, $\omega$ designates semi angle of view. Similarly, respective aberrations of Example 2 at an infinite object point are shown in FIGS. 4(A) through (D).

Here, as a comparative example, respective aberrations of the telephoto lens described in JP-A-2002-55275 (JP-A-2002-55275) are shown in FIGS. 5(A) through (D). According to the telephoto lens of the comparative example, in comparison with the telephoto lenses according to the examples, particularly, on-axis chromatic aberration and lateral color are increased. According to the telephoto lenses of the examples, particularly, on-axis chromatic aberration and lateral color are excellently corrected.

As is known from the respective numerical value data and the respective aberration diagrams, the respective examples can realize the high function telephoto lens in which on-axis chromatic aberration and lateral color are excellently corrected while restraining a number of sheets of anomalous dispersion glass used.

Further, the invention is not limited to the embodiment and the respective examples but can variously be modified to embody. For example, the values of the radii of curvature, the surface intervals and the refractive indices of the respective lens components are not limited to the values shown in the respective numerical value examples but can take other values.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-62459, filed Mar. 7, 2005, the contents of which are incorporated herein by reference.

What is claimed is:

1. A telephoto lens comprising, in order from an object side of the telephoto lens:

a first lens group having a positive refracting power;
a second lens group having a negative refracting power; and
a third lens group comprising an aperture diaphragm,
wherein the first lens group comprises: a first positive lens having a meniscus shape and having a convex surface on the object side thereof; a negative lens arranged on an image side of the first positive lens, the negative lens having a concave surface on the image side thereof; and a second positive lens arranged on the image side of the negative lens, the second positive lens having a convex surface on the object side thereof, and
the first lens group satisfies Condition Equations:

$$35 < v11 < 50 \quad (1)$$

$$v12 < 45 \quad (2)$$

$$75 < v13 \quad (3)$$

$$v12 < v11 \quad (4)$$

wherein
v11 represents an Abbe number of the first positive lens in the first lens group;
v12 represents an Abbe number of the negative lens in the first lens group; and
v13 represents an Abbe number of the second positive lens in the first lens group.

2. The telephoto lens according to claim 1, wherein the second lens group comprises a positive lens and a negative lens, and the second lens group is moved to the image side when a focus is adjusted from infinite to a close range.

3. The telephoto lens according to claim 1, which satisfies Condition Equation:

$$0.5 < f11/f < 1.2 \quad (5)$$

wherein
f represents a focal length of an entire system of the telephoto lens; and
f11 represents a focal length of the first positive lens in the first lens group.

4. The telephoto lens according to claim 1, wherein the first lens group satisfies Condition Equations:

$$38 < v11 < 45 \quad (1A)$$

$$v12 < 40 \quad (2A)$$

$$80 < v13 \quad (3A)$$

5. The telephoto lens according to claim 3, which satisfies Condition Equation:

$$0.55 < f11/f < 0.8 \quad (5A)$$

* * * * *